April 21, 1959  A. B. GOBBY  2,882,943
STATIONARY AUTOMOBILE WHEEL HOLDER
Filed Aug. 10, 1956
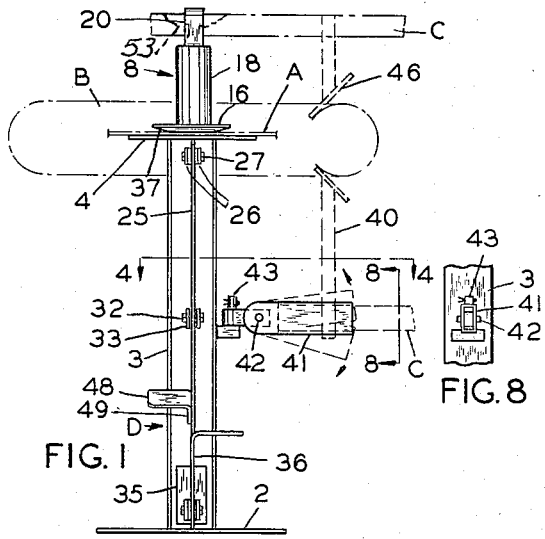
FIG. 1
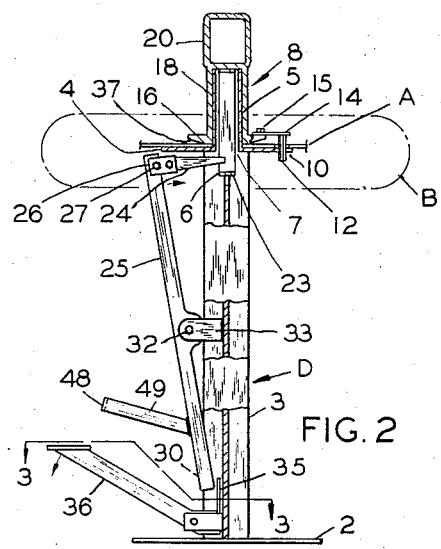
FIG. 2
FIG. 8
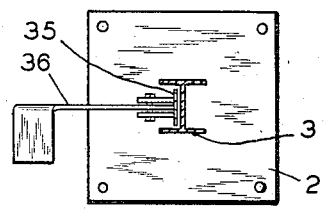
FIG. 3
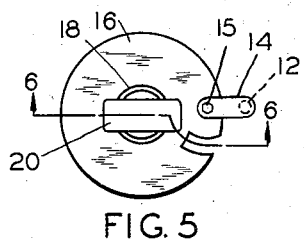
FIG. 5
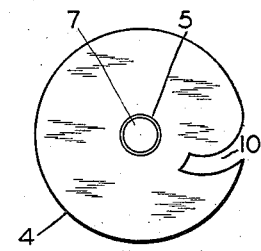
FIG. 9
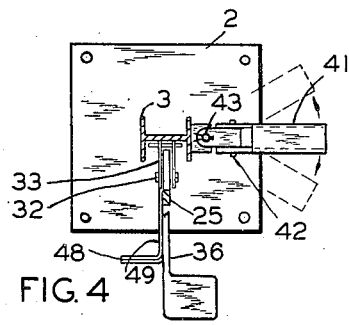
FIG. 4
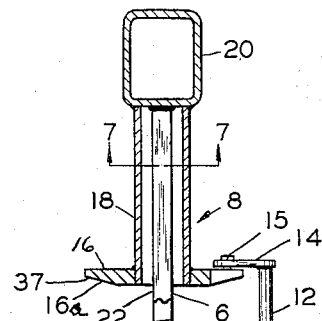
FIG. 6
FIG. 7
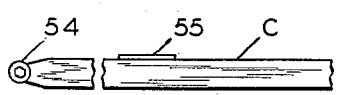
FIG. 10
INVENTOR.
Alan B Gobby
BY Scott L. Norvil
attorney

United States Patent Office 2,882,943
Patented Apr. 21, 1959

2,882,943

STATIONARY AUTOMOBILE WHEEL HOLDER

Alan B. Gobby, Glendale, Ariz.

Application August 10, 1956, Serial No. 603,344

3 Claims. (Cl. 144—288)

This invention pertains to stationary wheel holders for steel disk type automobile wheels.

One of the objects of the invention is to provide a support for a tire tool on which a wheel carrying a tire may be held firmly without rotation and secured centrally relative to the support so that tire removing and mounting tools and appliances may be conveniently and efficiently used.

Another object is to provide a tire changing tool in which provision is made for centrally positioning and holding a wheel on which a tire is mounted by manipulation of pedal mechanism and apparatus.

Still another object is to provide an efficient mechanism for holding an automobile wheel on which a tire is mounted so that it will not rotate or turn when tire changing tools are applied; said holding mechanism being provided with means for holding wheels of various sizes and including a pin for insertion through the bolt holes near the center of wheels of different sizes wherein the holes are located at different positions.

Still another object is to provide mechanism for mounting and holding an automobile wheel on top of a vertical standard so that the wheel is held centrally of the standard and the holding mechanism is operated by pedal mechanism whereby the user's hands are free to lift or turn the wheel and any tire thereon.

Other objects will appear hereinafter.

I attain the above objects by means of the device, combinations of parts, and special structures illustrated in the accompanying drawings, in which—

Figure 1 is a side elevational view of my automobile wheel holder as viewed from the front;

Figure 2 is a side elevational view of said wheel holder with parts broken away to show interior construction;

Figure 3 is a plan view of the wheel holder as shown in Figure 2 with the vertical member of the holder sectioned off substantially on line 3—3 of Figure 2;

Figure 4 is a plan view of the base portion of my wheel holder with the vertical member thereof sectioned substantially on line 4—4 of Figure 1;

Figure 5 is a plan view of the removable holding head;

Figure 6 is a vertical midsection of the holding head with the section taken substantially on line 6—6 of Figure 5;

Figure 7 is a section of the holding head taken on line 7—7 of Figure 6;

Figure 8 is a vertical elevation of a fragment of the support member of the wheel holder showing particularly the elevational end view of the lower bead breaking attachment;

Figure 9 is a plan view of the wheel support with the holding head removed; and

Figure 10 is a side elevation of a tire working bar.

Similar numerals refer to similar parts in the several views.

Referring to the drawings, 2 indicates a flat base plate which is adapted to be secured to the floor of the shop where the tire changer is to be installed. A vertical standard 3 is welded to the center of this base and extends upward a distance about waist high. This standard is preferably made of steel having an I beam section. On top of this standard is a circular flat plate 4 to which a centrally positioned vertical tubular boss 5 is attached so that it surrounds a central opening 7 to receive the depending wedge lock stem 6 of the wheel holding head, generally indicated by numeral 8. From the peripheral edge of plate 4 a substantially radially extending notch 10 is cut so as to receive a wheel locking pin 12 which is swingably supported on the plate 14. This plate is pivotally attached by a pin 15 to the frusto conical hold down plate 16 which is considered part of the holding head 8. A tube 18 extends upward from the center of the frusto conical plate 16 and is provided at the top with a rectangular shaped bar receiving eye 20. It is to be noted that the wedge lock stem 6 depends from the bottom portion of eye 20, extends through tube 18 and depends below the lower face of the frusto conical plate 16. Wedge lock stem 6 is composed of two vertical straps 22 which are parallel and joined at the bottom to form a stirrup 23 which receives the locking wedge 24. This locking wedge is held on top of locking lever 25 by link plates 26 which are on each side of both lever 25 and wedge 24. Bolts 27 holding the plates in place may have a somewhat loose fit in the holes provided for them so that wedge 24 may adjust itself within the stirrup 23 of wedge lock stem 6.

Wedge 24 on lever 25 is moved inward to wedging position in stirrup 23 by forcing the lower end 30 of lever 25 outward. Lever 25 is centrally supported on a pin bearing 32 attached to a U support 33 disposed at a position approximately one-half the height of standard 3. The lower end 30 of lever 25 is pushed outward by means of the hook piece 35 attached to foot pedal 36. By this mechanism downward motion of the foot pedal causes the hook 35 to force the lower end of lever 25 outward and this, in turn, forces the upper end of this lever inward, and in this way forces the wedge 24 into the stirrup 23 of the hold down wedge lock stem 6. It is to be noted that the flat upper edge face of the wedge contacts the lower face of plate 16 while the slanting lower edge face of the wedge contacts the bottom of stirrup 23.

Pressure on pedal 36 will hold member 6, by means of said wedge 24 and tube 18, so that plate 16 will bear on the central portion of wheel disk A and hold it tightly onto the upper face of plate 4. Boss 5 helps to center wheel A by extending through its hub hole. It then supports and positions tube 18, positions straps 22 which extend down through it, and holds head 8 in position. Automobile wheel B is finally centered on plate 4 by the beveled or frusto conical lower face 37 of hold down plate 16.

All conventional automobile wheels of this steel disk type are provided with a central hub hole and, therefore, the frusto conical or outwardly beveled face 16 will center the hub hole with reference to the center of plate 4 and boss 5.

In order to keep the wheel from turning the pin 12 is inserted downwardly through any one of the bolt holes which are annularly and concentrically arranged around the central hub hole of the wheel disk. Since these bolt holes are spaced at different distances from the hub hole on different styles of wheels the pin 12 is made radially adjustable by supporting it pivotally near the rim of plate 16. When the head 8 is dropped over boss 5 and onto a wheel resting on plate 4, pin 12 is swung in or out by means of plate 14, as may be necessary, to cause it to enter one of the bolt holes of the wheel disk. At the same time the wheel disk is rotated until the pin enters the hole. This is done after head 8 is in place and just prior to setting wedge 24 into stirrup 23 in order to tighten plate 16 down onto the wheel disk A.

With the wheel disk of the wheel held on plate 4 and tightened by the action of pedal 36 the tire casing on wheel disk may be worked on by any one of the usual casing tools necessary to demount the casing.

For example, a lower bead breaking tool 40 may be applied to an operating bar socket 41 which is hinged on pin 42 to provide vertical hinging motion, and on pin 43 to provide horizontal arcuate motion substantially concentric with the wheel rim. Work bar C is inserted into the socket 41 and the bead breaking spade tool 40 may be forced upward against the side wall and bead of the tire casing in order to force the bead into the drop center of the wheel rim. Similarly the bar C may be used to force the upper bead breaking tool 46 downward against the upper side wall and bead of the tire. In doing this one end of the bar C may be inserted in the eye 20 of the hold down head 8.

Other tools, such as bead removing bar tools, may be used by inserting one end thereof between the bead and the wheel rim and working the bar tool lever-wise against the vertical tube 18. In doing this the wheel disk tends to rotate but this is prevented because of the locking action of pin 12.

Other casing and rim tools may be used to replace or remove the casing beads from the wheel rim. Since these tools and their uses are well known to the art, and to persons familiar with mounting and demounting casings on wheels, no details or these tools are considered necessary to the description of the devices herein concerned except as hereinafter explained. This invention concerns the support D, including base 2, standard 3, and plate 4, and mechanism for holding the wheel disk and its casing in place on the support, such as head 8, so that said tools may be applied, as desired.

After the casing is mounted on or demounted from the wheel, as desired, the hold down assembly 8 is removed by loosening wedge 24. This is done by foot pressure, applied to the treadle 48 which consists of a bar 49 welded to and extending outward from the lower portion of the lever 25. Downward pressure on this treadle will cause the upper end of this lever to move outward and in this way loosen wedge 24 in the stirrup 23. As soon as the wedge is withdrawn the hold down assembly 8 may be lifted from the wheel disk and the wheel may then be lifted from the top of plate 4.

The tire working bar or tool 52, shown in Figure 10, is used for several operations while the wheel B is held on the wheel holder. This bar has a smooth flat hooked portion 53 to keep the end of the bar from sliding out of eye 20 when using the bar to operate the top bead breaker 46. The bar is shown in dotted outline in Figure 1. This hook portion is also used in removing the tire bead from the rim. In this use the curved portion of the hook is inserted under the bead and the flat side of the bar slides on the rim while the middle of the bar bears on tube 18. The bar may also be inserted in the socket 41 of the lower bead breaker. A metal spool hook 54 on the opposite end of the bar may be used for rolling the tire beads back onto the wheel rim. In doing this the flat backing bar 55 bears on tube 18 and keeps the bar from turning.

I claim:

1. A stationary wheel holder to hold a disk type steel automobile wheel having a central hub hole and bolt holes annularly spaced therearound, for mounting and demounting tires thereon, consisting of a base having a flat base plate, a vertical standard extending upward therefrom, a horizontal wheel supporting plate at the top of said standard having a central opening, a tubular boss extending upward from the edges of said opening, said wheel supporting plate having a notch extending substantially radially inward from the edge of said plate, a wheel holding head having a disk plate with a frusto conical under face for centering the hub hole of said wheel and a tube extending upward from its upper face, adapted to fit over and be supported by said boss and having a bar receiving eye at its top, a wedge receiving stirrup secured within said tube and extending downward through said tubular boss and through the opening in said wheel supporting plate, a pin for insertion through said wheel bolt holes of said wheel to prevent rotation, said pin being swingably mounted on the disk plate of said wheel holding head so that it will register with the notch in said wheel holding plate, and wedge means on said standard for drawing said wheel holding head downward onto the wheel supporting plate on said standard including a wedge engaging in said stirrup and a treadle operated lever pivoted to said standard and to said wedge.

2. A stationary wheel holder to hold a disk type steel automobile wheel having a central hub hole and bolt holes annularly spaced therearound, for mounting and demounting tires thereon, consisting of a base having a flat base plate, a vertical standard extending upward therefrom, a horizontal wheel supporting plate at the top of said standard having a central opening, a tubular boss extending upward from the edges of said opening, said wheel supporting plate having an arcuate notch extending substantially radially inward from the edge of said plate, a wheel holding head for downward holding on a wheel disk centrally disposed on said wheel supporting plate, consisting of a disk plate having a frusto conical lower face, a substantially radially extending arcuate edge notch registering with the notch in said wheel supporting plate and a central hole, a tube adapted to surround said boss extending upward from the edges of said hole and having a bar receiving eye at its top, a wedge receiving stirrup secured within said tube and depending from said eye through said tubular boss and through the hole in said horizontal wheel supporting plate, means for preventing rotation of said wheel consisting of a vertical pin mounted on a swing plate pivoted to the edge of said disk plate and disposed to enter said notches in said wheel supporting plate and disk plate and adapted to register with and extend through a bolt hole in a wheel disk disposed on said wheel supporting plate, and pedal operated wedge means supported on said standard, cooperative with said wedge receiving stirrup, to force said disk plate down onto a wheel centrally disposed on said wheel supporting plate.

3. A stationary wheel holder to hold a disk type steel automobile wheel having a central hub hole and bolt holes annularly spaced therearound, for mounting and demounting tires thereon, consisting of a base having a flat base plate, a vertical standard extending upward therefrom, a horizontal wheel supporting plate at the top of said standard having an arcuate notch extending substantially radially inward from the edge of said plate, and a central opening, a tubular boss extending upward from the edges of said opening, a wheel holding head for downward holding on a wheel disk centrally disposed on said wheel supporting plate, said head consisting of a disk plate having a frusto conical bottom face for centering the wheel disk hub hole, a substantially radially extending arcuate edge notch and a central hole, a tube adapted to surround said boss extending upward from the edges of said central hole and having a bar receiving eye at its top, a wedge receiving stirrup secured within said tube and depending from said eye through said tubular boss and through the hole in said horizontal wheel supporting plate, means for preventing rotation of said wheel consisting of a vertical pin on a swing plate pivotally mounted on the edge of said disk plate and disposed to enter said arcuate notches in said wheel supporting plate and said disk plate and adapted to register with and extend through a bolt hole in a wheel disk disposed on said wheel supporting plate, and pedal operated wedge means supported on said standard, cooperative with said wedge receiving stirrup, to force said disk plate down onto a wheel centrally disposed on said wheel supporting plate, said wedge means consisting of a vertical lever pivoted intermediate its ends on said base standard, a horizontally extending wedge having a straight top edge and a slanting bottom edge loosely pinned to the upper end of said lever and adapted to enter said wedge receiving stirrup so that said wedge bottom edge bears on the bottom of the stirrup and the wedge top edge bears against the under face of said wheel supporting plate, a foot pedal operating on said base adapted to move the bottom end of said lever away from said standard so that the wedge at the top of said lever is moved into said stirrup in wedging relation therewith, and a second foot pedal extending angularly from said lever so that downward motion of said second foot pedal will move the upper end of said lever, and the wedge thereon, outward from said stirrup.

References Cited in the file of this patent

UNITED STATES PATENTS

| | | |
|---|---|---|
| 2,471,642 | Moltz | May 31, 1949 |
| 2,505,172 | Coats | Apr. 25, 1950 |
| 2,609,039 | Henderson | Sept. 2, 1952 |
| 2,708,954 | Schultz | May 24, 1955 |